(12) United States Patent
King

(10) Patent No.: US 7,023,983 B2
(45) Date of Patent: Apr. 4, 2006

(54) VERSATILE CIRCUIT FOR INTERFACING WITH AUDIO HEADSETS

(75) Inventor: Jay Steven King, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 121 days.

(21) Appl. No.: 10/750,316

(22) Filed: Dec. 30, 2003

(65) Prior Publication Data

US 2005/0147229 A1    Jul. 7, 2005

(51) Int. Cl.
*H04M 1/02* (2006.01)
(52) U.S. Cl. .............................. 379/388.01; 455/575.1
(58) Field of Classification Search ................ 379/420, 379/419, 388.01, 387.01, 388.02; 381/74, 381/122; 455/73, 557–559, 550.1, 569.1, 455/575.1, 575.2, 575.6, 575
See application file for complete search history.

(56) References Cited

U.S. PATENT DOCUMENTS

| | | | |
|---|---|---|---|
| 5,341,254 A | 8/1994 | Ueno | |
| 5,396,551 A | 3/1995 | Lucey | |
| 5,444,417 A | 8/1995 | Botti et al. | |
| 5,448,646 A | 9/1995 | Lucey et al. | |
| 5,568,561 A | 10/1996 | Whitlock | |
| 5,794,163 A * | 8/1998 | Paterson et al. | 455/575.2 |
| 6,069,960 A | 5/2000 | Mizukami et al. | |
| 6,107,886 A | 8/2000 | Kusakabe et al. | |
| 6,172,561 B1 | 1/2001 | Schott | |
| 6,397,087 B1 | 5/2002 | Kim et al. | |
| 6,556,077 B1 | 4/2003 | Schaffer et al. | |
| 6,563,380 B1 | 5/2003 | Huijser | |
| 6,594,366 B1 * | 7/2003 | Adams | 381/74 |
| 2003/0138112 A1 * | 7/2003 | Doy | 381/74 |

* cited by examiner

*Primary Examiner*—Sinh Tran
*Assistant Examiner*—Walter F Briney, III
(74) *Attorney, Agent, or Firm*—Philip R Wadsworth; Charles D Brown; George C Pappas

(57) ABSTRACT

A signal conditioning circuit is described which can facilitate dual mode use of a connector circuit, e.g., audio mode or data mode. In other words, a headset or alternatively, a data interface may be coupled to the connector circuit and signal conditioning circuit, depending on the mode of the device. In accordance with this disclosure, the signal conditioning circuit operates in audio mode without the need for conventional blocking capacitors in the speaker channels. Moreover, in some embodiments, the signal conditioning circuit also provides backwards compatibility with conventional connector circuits that include such blocking capacitors.

27 Claims, 6 Drawing Sheets

VERSATILE CIRCUIT FOR INTERFACING WITH AUDIO HEADSETS

TECHNICAL FIELD

This disclosure relates to electrical circuits and, more particularly, to signal conditioning circuits that facilitate attachment of an audio headset to a device.

BACKGROUND

Wireless communication devices allow users to communicate via wireless telecommunication signals. A wide variety of wireless techniques have been developed to facilitate such communication. Examples of wireless communication techniques include code division multiple access (CDMA), frequency division multiple access (FDMA), time division multiple access (TDMA), as well as a number of other techniques. One common wireless communication device is a mobile radiotelephone. Another common wireless communication device is a direct two-way communication device. A variety of other wireless devices and gadgets can similarly incorporate wireless communication capabilities.

In order to facilitate "hands free" communication on a wireless communication device, headsets have been developed. A headset typically includes a microphone and one or more speakers that are worn by the user. The speakers provide audio output to the user, and the microphone allows the user to speak into the headset. The headset couples to the wireless communication device so that audio signals can be sent to and from the user. For example, the headset may couple to the wireless communication device via an earphone and/or microphone port of the communication device. Different types of interfaces have been developed to allow different headsets to communicatively couple to different wireless communication devices. Hands-free communication is particularly useful in settings where the user needs to maintain use of his or her hands, such as when driving a vehicle or when operating machinery.

In order to allow for headset attachment to a wireless communication device, the wireless communication device typically includes a connector circuit and a signal conditioning circuit. The connector circuit provides the physical interface for electrical coupling between the device and the headset. The signal conditioning circuit provides basic analog signal conditioning to signals sent to and from headset. For example, the signal conditioning circuit may provide a bias voltage needed to properly bias the microphone. In addition, the signal conditioning circuit includes channels with amplifiers for amplifying audio signals sent to drive the speakers.

In the connector circuit, blocking capacitors are often included in the speaker channels to prevent DC signals from flowing through the headset speakers, whose return path typically couples to ground. A blocking capacitor and speaker essentially form a high pass filter that allows high frequency signals in the channels to pass through the speaker but blocks lower frequency and DC signals. Increasing the capacitance of the blocking capacitors can help avoid frequency loss in the audio signal delivered to the speakers. Use of large blocking capacitors, however, can add significant cost to the circuit and may take up valuable circuit space in the device.

SUMMARY

This disclosure is directed to circuits that facilitate attachment of a headset to a device. In one aspect of this disclosure, a signal conditioning circuit is described which can facilitate dual mode use of a connector circuit, e.g., audio mode or data mode. In particular, the signal conditioning circuit operates in audio mode without the need for conventional blocking capacitors in the speaker channels. In addition, the signal conditioning circuit may also provide backwards compatibility with conventional connector circuits that include such blocking capacitors. In this manner, the signal conditioning circuit provides versatility which can be exploited by a device manufacturer, e.g., to use the same signal conditioning circuit with different connector circuits.

In one embodiment, this disclosure describes a circuit comprising a first multiplexer to select a bias for a microphone when the microphone is electrically coupled to the circuit, and a channel to provide a signal to a speaker, the signal including an alternating current (AC) component and direct current (DC) component, the DC component being approximately equal to a common mode voltage. The circuit also includes a return path for the microphone and the speaker, the return path including a second multiplexer to select the common mode voltage when the microphone and speaker are coupled to the circuit and to select a ground voltage when the microphone and speaker are not coupled to the circuit.

In another embodiment, this disclosure describes a circuit comprising a first multiplexer programmed to select a bias for a microphone based on whether a blocking capacitor is used with a speaker, and a channel to provide a signal to the speaker, the signal including an alternating current (AC) component and direct current (DC) component approximately equal to a common mode voltage. The circuit also includes a return path for the microphone and the speaker, the return path including a second multiplexer to select the common mode voltage when the blocking capacitor is used in the channel and to select a ground voltage when the blocking capacitor is not used in the channel, wherein the selected bias defines a voltage sufficient to properly bias the microphone when the blocking capacitor is used and the selected bias defines the voltage sufficient to properly bias the microphone plus the common mode voltage when the blocking capacitor is not used.

In another embodiment, this disclosure describes a circuit comprising a channel to provide a signal to a speaker, the signal including an alternating current (AC) component and a direct current (DC) component that is approximately equal to a common mode voltage, and a return path for the speaker, the return path including a multiplexer to select the common mode voltage when a blocking capacitor is used in the channel and to select a ground voltage when the blocking capacitor is not used in the channel.

The circuits described herein may find use with any device that uses an audio headset. Mobile radio telephones and two-way communication devices are two examples, but many other devices could also benefit from the teaching of this disclosure. In many cases, the circuits are used with devices that use audio headsets with microphone, but this disclosure is not necessary limited in that respect. Additional details of various embodiments are set forth in the accompanying drawings and the description below. Other features, objects and advantages will become apparent from the description and drawings, and from the claims.

DETAILED DESCRIPTION

In general, this disclosure describes circuits that facilitate attachment of a headset to a device. In the examples of this disclosure, the circuits are designed for use with devices that use audio headsets with microphone, but this disclosure is not necessary limited in that respect. In other words, the circuits described herein may have advantages and applications for interfacing with audio speakers without a microphone.

For example, a signal conditioning circuit is described which can facilitate dual mode use of a connector circuit, e.g., audio mode or data mode. In other words, a headset with microphone, or alternatively, a data interface may be coupled to the connector circuit and signal conditioning circuit, depending on the mode of the device. In accordance with this disclosure, the signal conditioning circuit operates in audio mode without the need for conventional blocking capacitors in the speaker channels. By eliminating the need for blocking capacitors, a connector circuit can be simplified for a device that operates in both data mode and audio mode.

In some embodiments, the signal conditioning circuit eliminates the need for conventional blocking capacitors, but also provides backwards compatibility with conventional connector circuits that include such blocking capacitors. In this manner, the signal conditioning circuit provides versatility which can be exploited by a device manufacturer. In other words, the described signal conditioning circuit may operate with a connector circuit that does not include blocking capacitors as described herein, or may alternatively operate with a conventional connector circuit that includes such blocking capacitors. This "backwards compatibility" allows a device manufacturer to make the manufacturing decisions regarding the use or elimination of the blocking capacitors.

Figure 1:
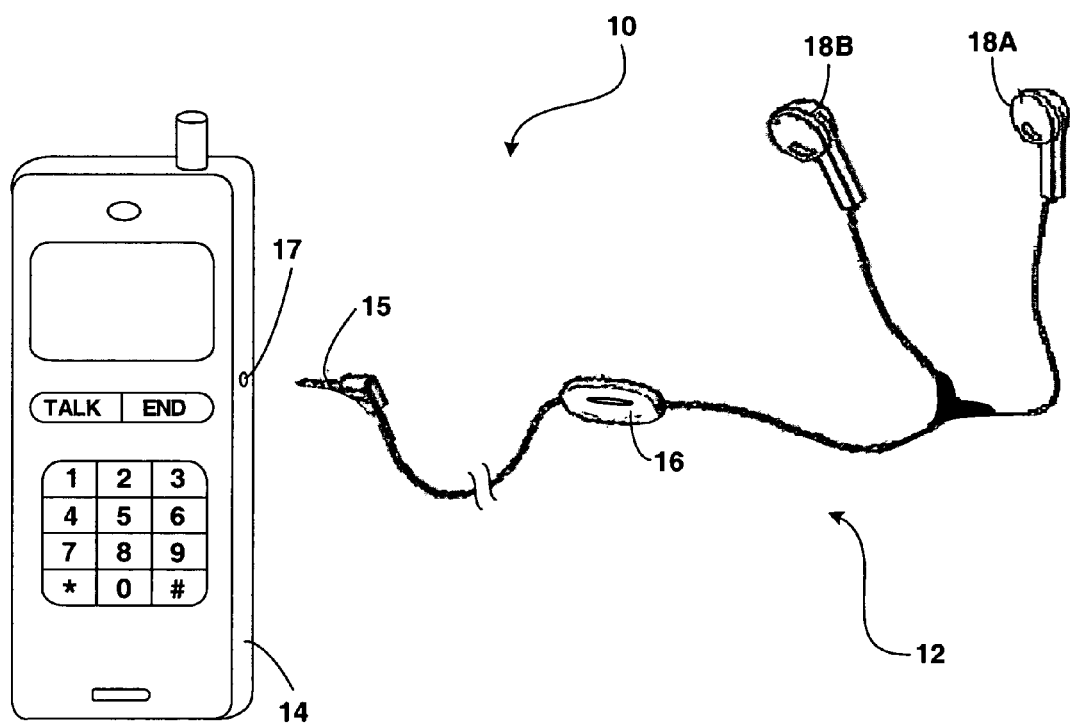
FIG. 1 is a perspective view of a system that may incorporate a circuit as described in this disclosure.

FIG. 1 is a perspective view of a system 10 that may incorporate a circuit as described in this disclosure. System 10 includes a headset 12 that couples to device 14 to facilitate hands-free wireless communication via device 14. Headset 12 includes a microphone 16 and one or more speakers 18A, 18B that are worn by the user. In some embodiments, headset 12 may be a stereo headset that delivers audio to the different speakers 18A, 18B via different audio channels. In any case, speakers 18 provide audio output to the user, and microphone 16 allows the user to speak into headset 12.

Headset 12 couples to device 14 so that audio signals can be sent to and from the user. For example, headset 12 may couple to device 14 via an earphone and/or microphone port of device 14, or any other communication port. In general headset 12 includes a plug 15 that mates with a port 17 of device 14 to facilitate electrical coupling. A wide variety of different types of interfaces, for example, have been developed to allow different headsets to communicatively couple to devices.

As illustrated in FIG. 1, device 14 comprises a mobile radiotelephone. However, the techniques and circuits described herein may be useful with a wide variety of other types of communication devices or audio gadgets. In some cases, device 14 may have audio capabilities for playing MP3 files or other music files.

In order to allow for attachment of headset 12 to device 14, device 14 includes a connector circuit, and a signal conditioning circuit. The connector circuit provides the physical interface for electrical coupling between device 14 and the headset 12. For example, port 17 may comprise a mechanical portion of the connector circuit.

The signal conditioning circuit couples to the connector circuit to provide analog signal conditioning to input or output signals. For example, the signal conditioning circuit may provide a bias needed to properly bias microphone 16 when headset 12 is coupled to device 14. In addition, the signal conditioning circuit includes channels with amplifiers for sending amplified audio signals to speakers 18.

In accordance with this disclosure, the signal conditioning circuit of device 14 allows for dual mode use of the connector circuit, e.g., audio mode or data mode. In other words, a data interface (not shown) may be alternatively coupled to device 14 via port 17 to facilitate data communication between device 14 and another device. In audio mode, the signal conditioning circuit can operate without the need for conventional blocking capacitors in the speaker channels. By eliminating the need for blocking capacitors, a connector circuit can be simplified for device 14 that operates in both data mode and audio mode. However, the signal conditioning circuit may also provide backwards compatibility with conventional connector circuits that include blocking capacitors. In other words, the signal conditioning circuit may be programmable to work with or without blocking capacitors. In this manner, the signal conditioning circuit provides versatility to the circuit which can be exploited by a device manufacturer.

Figure 2:
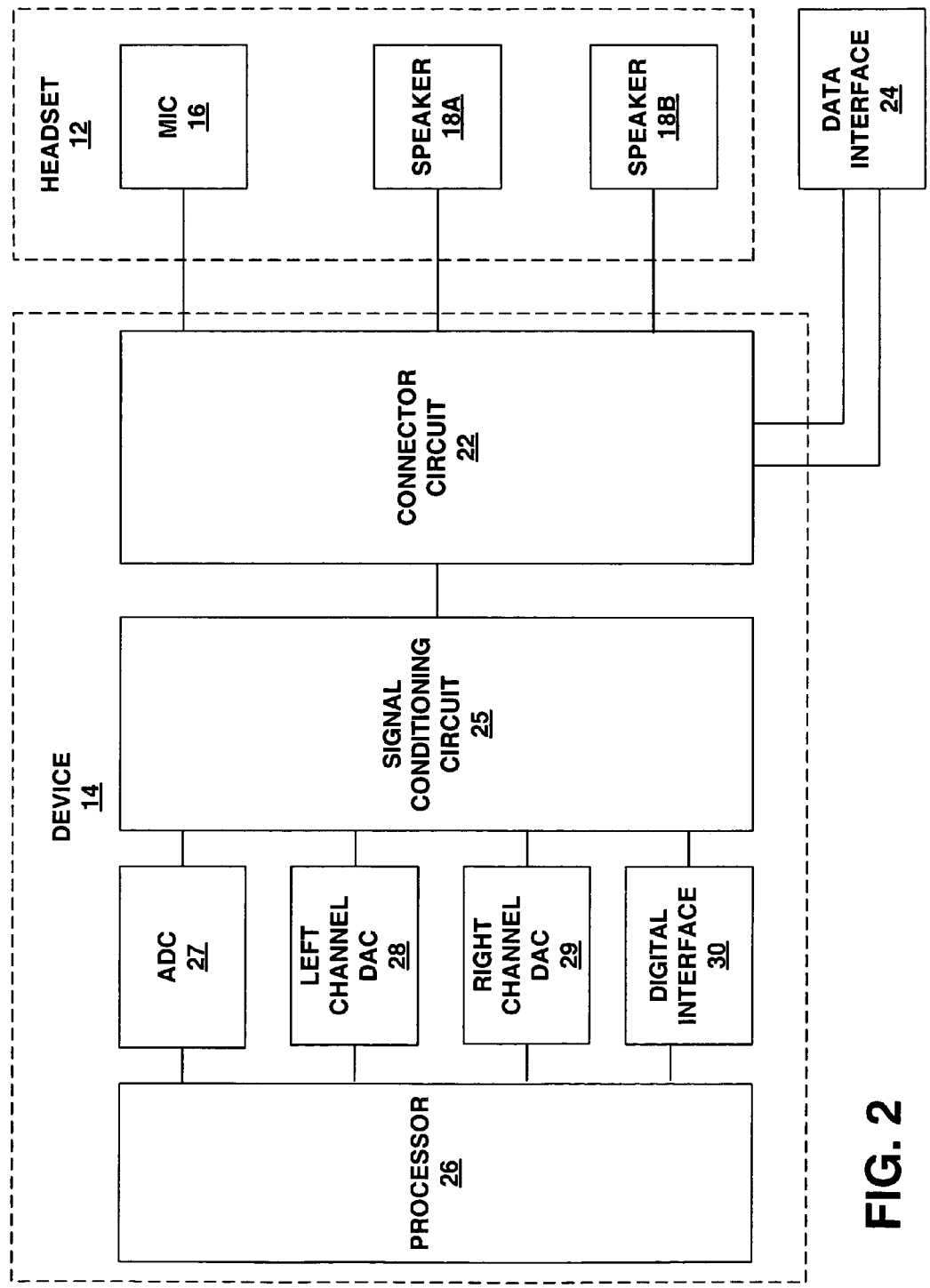
FIG. 2 is a block diagram of a device that includes a signal conditioning circuit according to an embodiment of this disclosure.

FIG. 2 is a block diagram of device 14 that includes a signal conditioning circuit 25 according to an embodiment of this disclosure. Device 14 also includes a connector circuit 22 that can receive either a headset 12 or a data interface 24. Data interface 24, for example, may couple device 14 to a personal computer, workstation, another wireless communication device, or any other computer so that data can be transferred between the devices.

Connector circuit 22 electrically couples with signal conditioning circuit 25. Device 14 may also include a processor 26, such as a digital signal processor, a general purpose microprocessor, an application specific integrated circuit, or the like. One or more digital to analog converters (DACs), one or more analog to digital converters (ADCs), and one or more digital interfaces allow for data transfer to and from processor 26. For example, ADC 27 may convert analog signals received from microphone 16 to digital signals that can be processed in processor 26. Left and right channel DACs 28, 29 may convert digital signals from processor 26 to analog signals. Signal conditioning circuit 25 includes one or more amplifiers for each speaker channel in order to amplify the analog signals from DACs 28, 29 and properly drive speakers 18A, 18B. Digital interface 30 allows for transfer of digital data to and from processor 26, e.g., through circuits 25, 22 to data interface 24.

Figure 3:
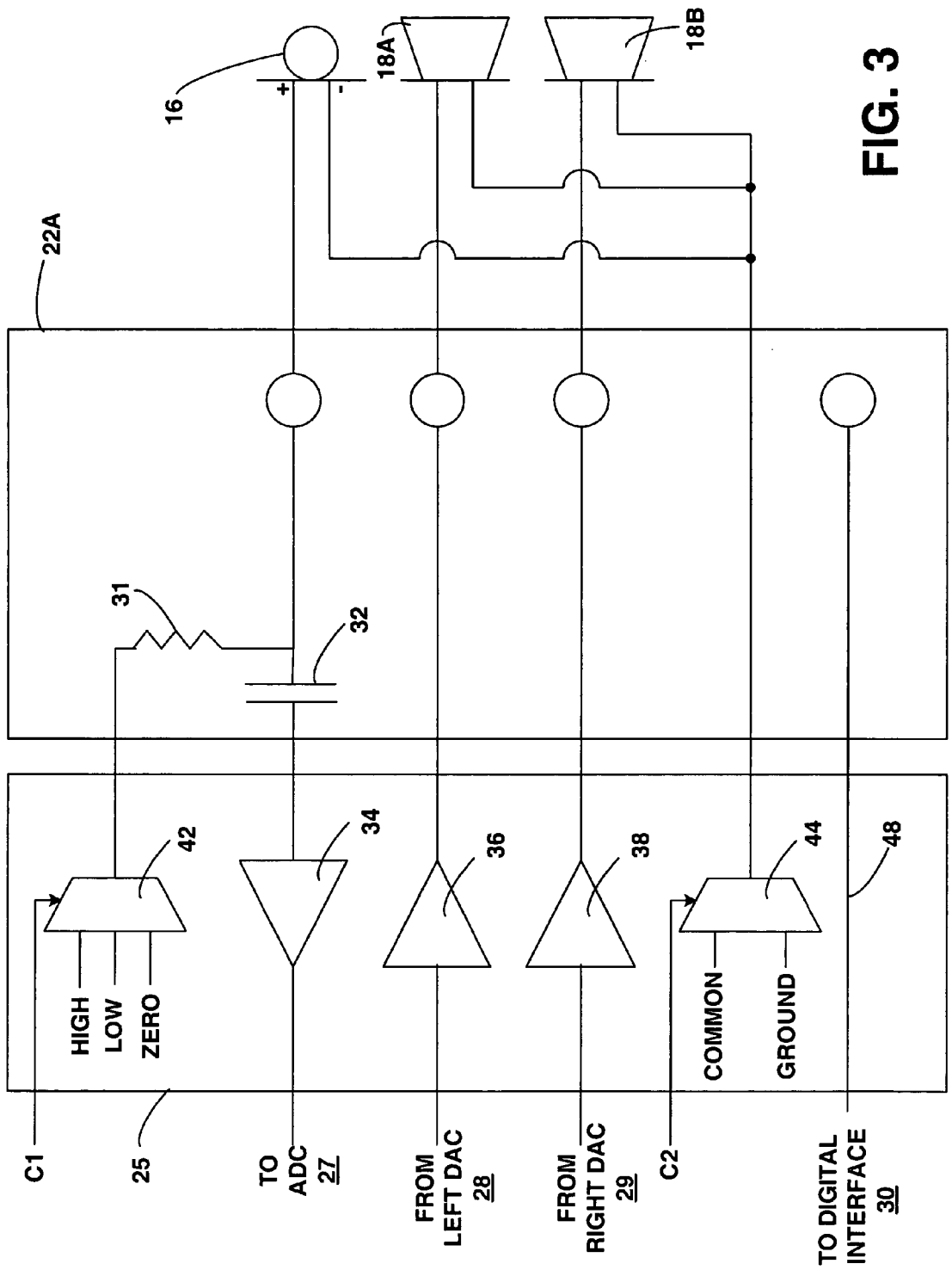
FIG. 3 is circuit diagram illustrating a signal conditioning circuit and a connector circuit coupled to a microphone and speakers according to an embodiment of this disclosure.

FIG. 3 is circuit diagram illustrating one embodiment of a signal conditioning circuit 25 and a connector circuit 22A. In particular, FIG. 3 illustrates circuits 25, 22A when headset 12 is coupled to device 14. In that case, microphone 16 and speakers 18A, 18B electrically couple to connector circuit 22A and signal conditioning circuit 25. Audio input into microphone passes through an input channel to the processor 26 (FIG. 2). In particular, AC input from microphone 16 passes through capacitor 32 into amplifier 34. Capacitor 32 blocks the DC bias provided to microphone 16 from affecting the signals sent to processor 26. Bias resistor 31 ensures that desired voltage changes in the input channel occur in response to microphone input. Amplifier 34 scales the input signals and forwards them to ADC 27, which converts the signals to digital samples and forwards the digital samples to processor 26 (FIG. 2).

Audio output from processor 26 passes through left and right speaker channels respectively. In particular, left channel output from the processor is converted to analog via left channel DAC 28. The analog signal is then amplified by left channel amplifier 36. The amplified left channel signal drives speaker 18A. Similarly, right channel output from the processor is converted to analog via the right channel DAC 29, and the right channel analog signal is then amplified by right channel amplifier 38. The amplified right channel signal drives speaker 18B.

In accordance with this disclosure, signal conditioning circuit 25 is designed to be versatile. In particular, signal conditioning circuit 25 includes a first multiplexer 42 that can select a desired microphone bias from a plurality of bias voltages. One or more voltages sources may provide the input to first multiplexer 42. A control signal C1 can be used to program first multiplexer 42. Moreover, in some cases, control signal C1 may be responsive to a detected mode, e.g., detected data or audio modes.

A second multiplexer 44 selects a reference voltage for the return path from speakers 18 and microphone 16. In order to eliminate the need for blocking capacitors in the left and right speaker channels, first multiplexer 42 selects "high" bias voltage to generate a bias for microphone 16. At the same time, second multiplexer 44 selects a reference voltage as the common mode voltage. The high bias voltage output by first multiplexer 42 comprises a voltage sufficient to bias microphone 16 plus the common mode voltage. In other words, the high bias voltage includes sufficient voltage to bias microphone 16 relative to ground, plus the common mode voltage, since the common mode voltage is the reference voltage in the return path.

The common mode voltage output by second multiplexer 44 approximately equals the voltages at the outputs of amplifiers 36 and 38. Accordingly, DC voltage does not drop across speakers 18A, 18B. Put another way, multiplexer 44 eliminates the need for blocking capacitors in the speaker channel by selecting the common mode voltage during speaker operation such that no DC voltage drop occurs across speakers 18A, 18B.

Control signals C1 and C2 can define the output of multiplexers 42, 44, as described herein. Control signals C1 and C2 may be programmed into signal conditioning circuit 25, or may be generated in response to detection of headset 12 being coupled to device 14. For example, multiplexers 42, 44 may output different voltages if headset 12 is not coupled to device 14 or if a data interface 24 is coupled to device 14 instead of headset 12. For example, connector circuit 22 may include a mechanism for determining whether headset 12 is coupled to device 14, and control signals C1 and C2 may be responsive to such detection.

As one example, connector circuit 22 may include a mechanism for detecting mechanical pins of headset 12 versus pins of a data interface 24. Alternatively, connector circuit 22 may include a comparator unit to detect different resistance or other qualities that may differ between insertion of headset 12 versus coupling of data interface 24. In still other cases, one or more ADC's may be used to monitor the lines of connector circuit 22A in order to determine whether headset 12 or data interface 24 is coupled to connector circuit 22A. In any case, control signals C1 and C2 may be responsive to detection of headset 12 or data interface 24 so that signal conditioning circuit 25 can automatically adjust for different modes of operation.

Figure 4:
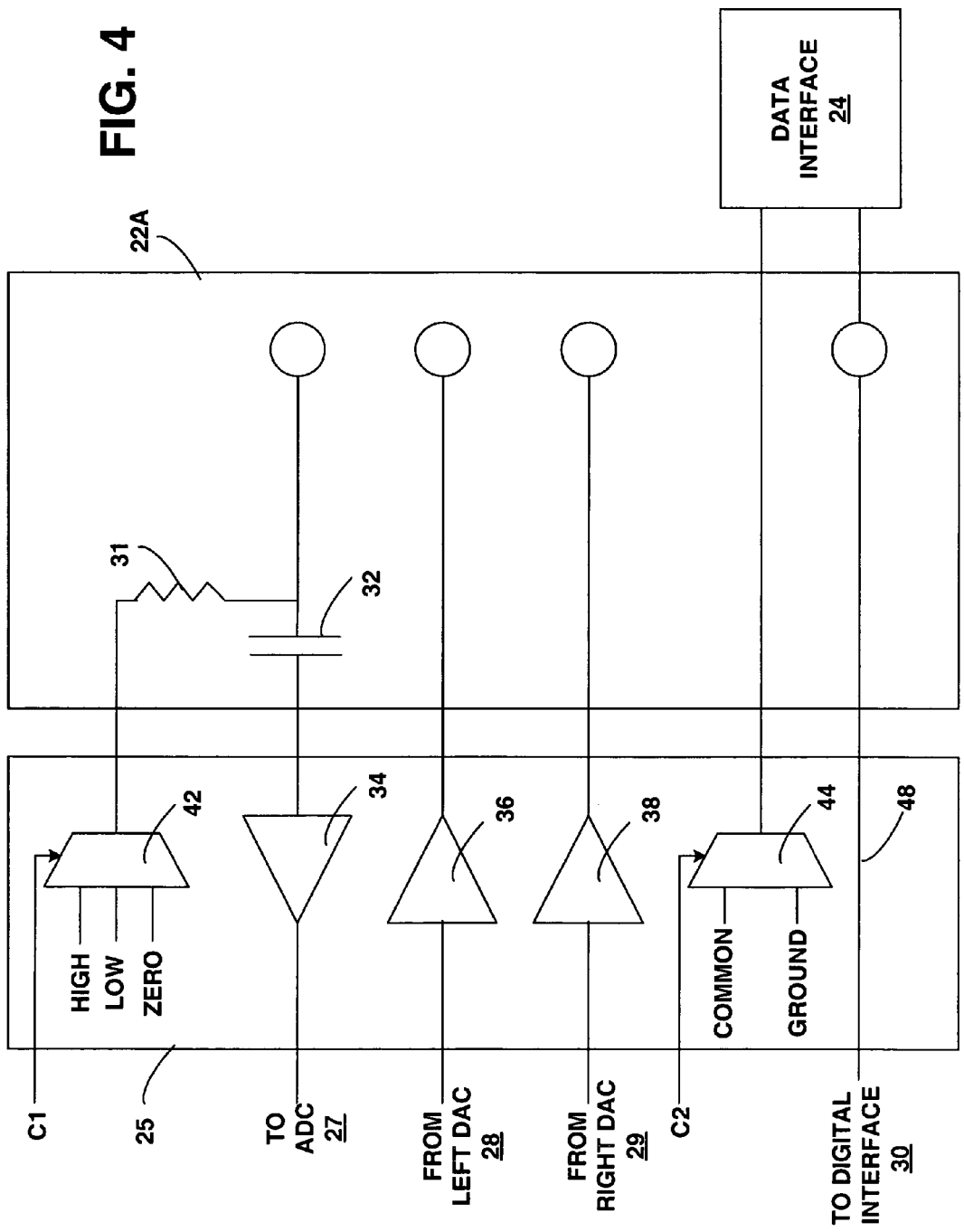
FIG. 4 is circuit diagram illustrating a signal conditioning circuit and a connector circuit coupled to a data interface according to an embodiment of this disclosure.

FIG. 4 is a circuit diagram illustrating signal conditioning circuit 25 and a connector circuit 22A coupled to data interface 24 according to an embodiment of this disclosure. In that case, data interface 24 replaces speakers 18 and microphone 16. For example, data interface 24 may be inserted into port 17 (FIG. 1) rather than plug 15 of headset 12. Data interface 24 may facilitate data transfer between device 14 and another device.

When data interface 24 is coupled to connector circuit 22A as shown in FIG. 4, second multiplexer 44 selects ground voltage for the return path. Accordingly, voltage-modulated signals can be transferred over one or more data lines 48 relative to a known reference value, i.e., ground, which should be the same for both device 14 and another device that communicates with device 14 via data interface 24. In this manner, multiplexer 44 specifically allows for selection between ground and a common mode voltage based on whether device 14 is in data mode or audio mode. Moreover, because the return path voltage is selected as the common mode voltage when device 14 is in audio mode (as shown in FIG. 3), the need for blocking capacitors in the speaker channels can be eliminated.

When data interface 24 is coupled to connector circuit 22A as shown in FIG. 4, first multiplexer 42 selects "zero" voltage, e.g., in order to conserve power. Control signals C1 and C2 can define the output of multiplexers 42, 44, as described herein. For example, control signals C1 and C2 may be programmed into signal conditioning circuit 25, or may be generated in response to detection of data interface 24 being coupled to device 14. In particular, multiplexers 42, 44 may select the output voltages based on whether headset 12 or data interface 25 is coupled to device 14. As described above, connector circuit 22 may include a mechanism for determining whether headset 12 is coupled to device 14, and control signals C1 and C2 may be responsive to such detection.

Another advantage of signal conditioning circuit 25 is the ability to provide backwards compatibility with conventional connector circuits that include blocking capacitors. In other words, signal conditioning circuit 25 may be programmable to work with or without blocking capacitors. In this manner, signal conditioning circuit 25 provides versatility to the device manufacturer.

Figure 5:
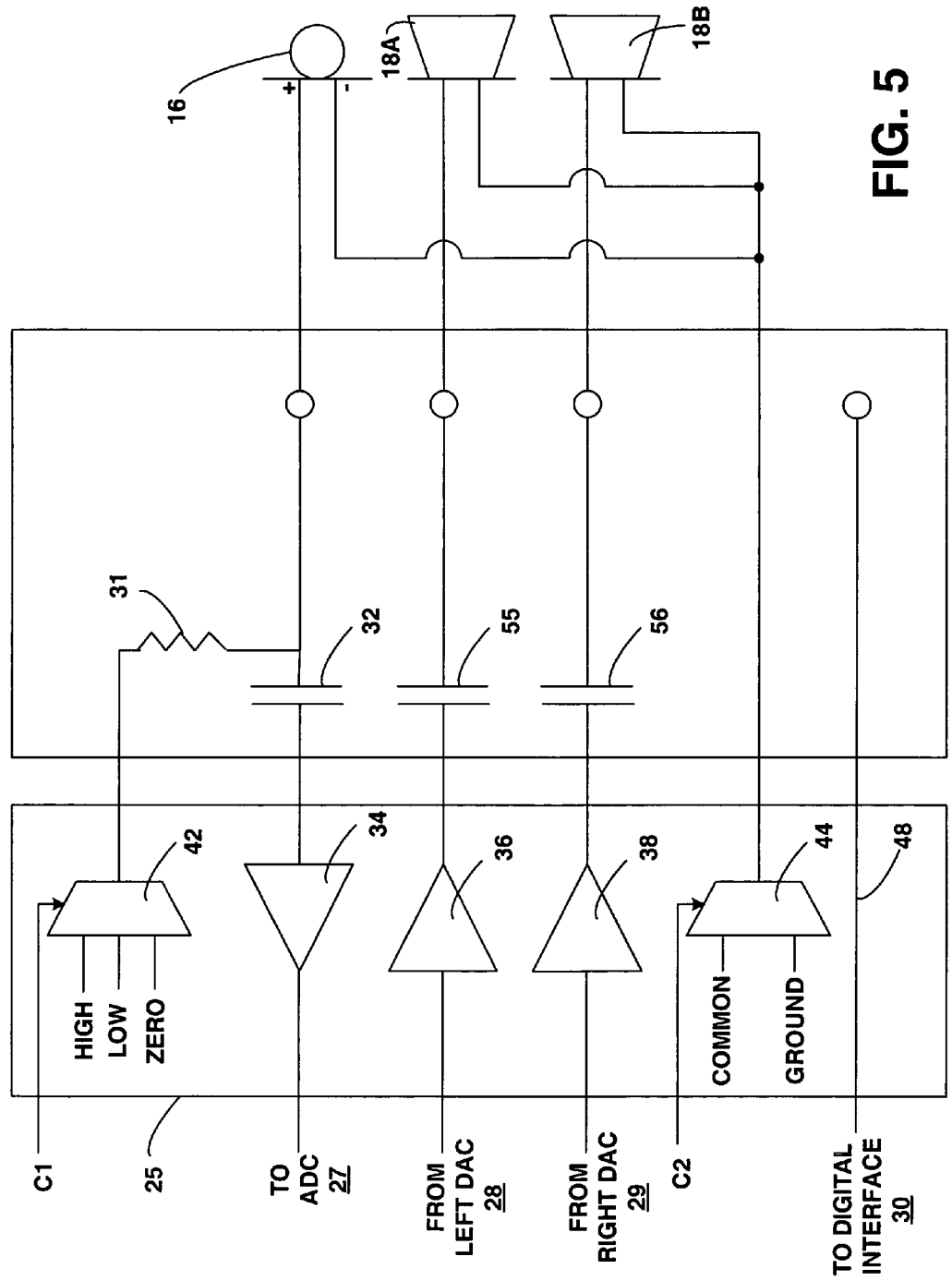
FIG. 5 is another circuit diagram illustrating a signal conditioning circuit and a connector circuit coupled to a microphone and speakers according to an embodiment of this disclosure.

FIG. 5 is another circuit diagram illustrating signal conditioning circuit 25. In this case, however, signal conditioning circuit 25 is coupled to connector circuit 22B which includes blocking capacitors 55, 56 in the respective speaker channels.

When blocking capacitors 55, 56 are included in connector circuit 22B as shown in FIG. 5, the return path voltage would be set to ground by second multiplexer 44. Accordingly, the bias provided to sufficiently bias microphone 16 would not need the additional common mode voltage component. In other words, when signal conditioning circuit 25 is coupled to connector circuit 22B that includes blocking capacitors 55, 56 in the speaker channels, first multiplexer 42 is programmed to select "low voltage bias" and second multiplexer 42 is programmed to select ground. The low voltage output by first multiplexer 42 comprises a voltage sufficient to bias microphone 16, without the additional common mode voltage component.

A manufacturer may assemble circuits 25 and 22B in making device 14. In doing so, the manufacturer may program control signals C1 and C2 to select the proper voltages needed for operation of the device when blocking capacitors are used. By providing such backwards compatibility to signal conditioning circuit 25, circuit 25 is more versatile. Accordingly, the decision whether to use or not use blocking capacitors can be made by the manufacturer of device 14. The manufacturer, for example, may possess a number of legacy connector circuits that include blocking capacitors, as well as newer connector circuits that eliminate such blocking capacitors. Signal conditioning circuit 25 can be used with either, and can be easily programmed by the device manufacturer by programming control signals C1, C2 to cause selection of the desired voltages.

Figure 6:
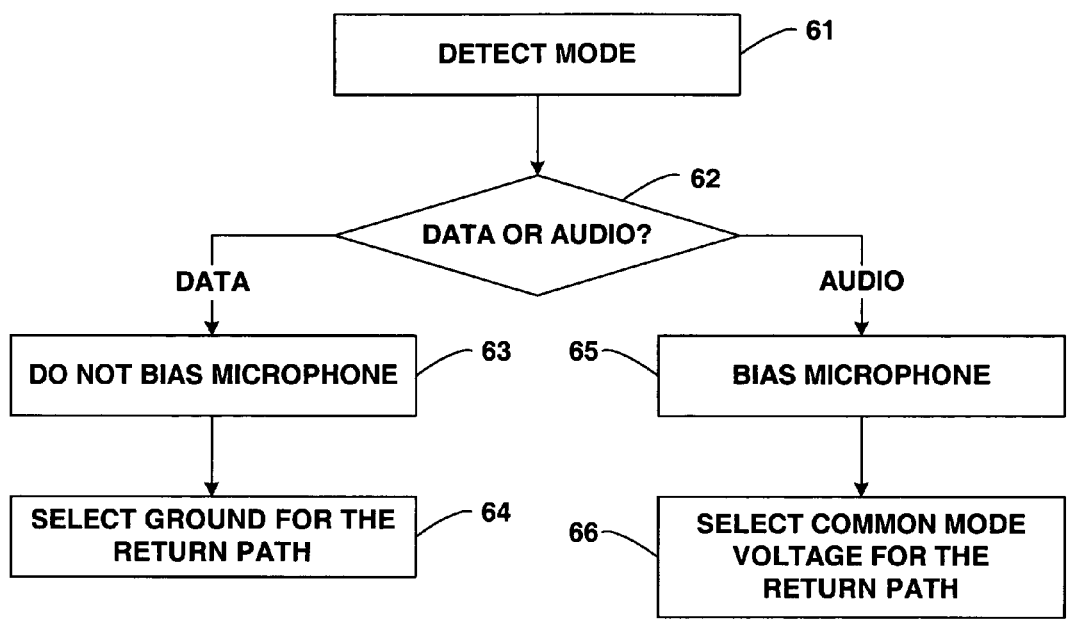
FIG. 6 is a flow diagram illustrating a technique implemented in a device to facilitate data or audio mode in the device.

FIG. 6 is a flow diagram illustrating a technique implemented in a device to facilitate data or audio mode in the device. In particular, FIG. 6 illustrates the ability of signal conditioning circuit 25 to operate in audio mode without blocking capacitors (as shown in FIG. 3) or in data mode with a return path to ground (as shown in FIG. 4).

As illustrated in FIG. 6, device 14 detects the mode (61). For example, connector circuit 22A may include a mechanism for detecting mechanical pins of headset 12 or different pins of a data interface 24. Alternatively, connector circuit 22A may include a comparator unit to detect different resistance or other qualities that may differ between insertion of headset 12 versus coupling of data interface 24. As still other cases, one or more ADC's may be used to monitor the lines of connector circuit 22A in order to determine whether headset 12 or data interface 24 is coupled to connector circuit 22A. In any case, control signals C1 and C2 may be responsive to detection of headset 12 or data interface 24 so that signal conditioning circuit 25 can be responsive to different modes.

In particular, if data mode is detected (DATA branch of 62), first multiplexer 42 selects a zero voltage so that microphone is not biased (63). This conserves power in data mode by avoiding unnecessary generation of a bias. Moreover, in data mode, second multiplexer 44 selects ground (64) so that a common reference is established for data communication between device 14 and another device externally coupled to data interface 24.

Alternatively, if audio mode is detected (AUDIO branch of 62), first multiplexer 42 selects the high voltage so that microphone is biased (65), and second multiplexer 44 selects the common mode voltage so that no DC voltage drops across speakers (66). Again, the common mode voltage is approximately equal to the voltage at the outputs of amplifiers 36, 36 in the respective speaker channels. The high voltage comprise a voltage sufficient to bias microphone 16 plus the common mode voltage. The voltage sufficient to bias microphone 16 is generally dependent on the design of the microphone and typically falls within an operating range associated with microphone 16.

A number of embodiments have been described. In particular, a signal conditioning circuit has been described which can facilitate dual mode use of a connector circuit, e.g., audio mode or data mode. Moreover, in accordance with this disclosure, the signal conditioning circuit operates in audio mode without the need for conventional blocking capacitors in the speaker channels. In many embodiments, the described circuits are designed to receive a headset with microphone or a data interface.

However, in other embodiments, the headset or speakers would not necessarily include a microphone. In that case, the components of signal conditioning circuit 25 associated with the microphone including multiplexer 42 could be eliminated. Moreover, if a microphone is not used, the technique of FIG. 6 would eliminate the steps 63 and 65. In other words, in that case, when the data mode is detected (DATA branch of 62), multiplexer 44 would select ground (64) so that a common reference is established for data communication between device 14 and another device externally coupled to data interface 24, and if the audio mode is detected (AUDIO branch of 62) multiplexer 44 would select the common mode voltage so that no DC voltage drops across speakers (66).

In some embodiments, the signal conditioning circuit also provides backwards compatibility with conventional connector circuits that include such blocking capacitors. In other words, the described signal conditioning circuit may operate with a connector circuit that does not include blocking capacitors as described herein, or may alternatively operate with a connector circuit that includes blocking capacitors. Such embodiments may also operate with or without the components that facilitate microphone attachment. Nevertheless various modifications can be made to the teaching of this disclosure without departing from the spirit and scope of the invention. These and other embodiments are within the scope of the following claims.

The invention claimed is:

1. A circuit comprising:
    a first multiplexer to select a bias for a microphone when the microphone is electrically coupled to the circuit;
    a channel to provide a signal to a speaker, the signal including an alternating current (AC) component and direct current (DC) component, the DC component being approximately equal to a common mode voltage; and
    a return path for the microphone and the speaker, the return path including a second multiplexer to select the common mode voltage when the microphone and speaker are coupled to the circuit and to select a ground voltage when the microphone and speaker are not coupled to the circuit.

2. The circuit of claim 1, wherein the second multiplexer selects the ground voltage when a data interface is coupled to the circuit and the microphone and speaker are not coupled to the circuit.

3. The circuit of claim 1, wherein the first multiplexer selects an OFF setting when the microphone and speaker are not coupled to the circuit, the OFF setting providing no bias.

4. The circuit of claim 1, wherein the selected bias defines a voltage sufficient to properly bias the microphone plus the common mode voltage.

5. The circuit of claim 1, wherein the first multiplexer is programmable to select the bias from one of a plurality of biases based on whether or not a blocking capacitor is included in the channel.

6. The circuit of claim 1, further comprising a plurality of channels to provide signals to a plurality of speakers, the plurality of signals each including a respective AC component and a respective DC component approximately equal to the common mode voltage, wherein each of the plurality of speakers couple to the return path.

7. A circuit comprising:
a first multiplexer programmed to select a bias for a microphone based on whether a blocking capacitor is used wit a speaker;
a channel to provide a signal to the speaker, the signal including an alternating current (AC) component and a direct current (DC) component that is approximately equal to a common mode voltage; and
a return pat for the microphone and the speaker, the return path including a second multiplexer to select the common mode voltage when the blocking capacitor is not used in the channel and to select a ground voltage when the blocking capacitor is used in the channel, wherein the selected bias defines a voltage sufficient to properly bias the microphone when the blocking capacitor is used and the selected bias defines the voltage sufficient to properly bias the microphone plus the common mode voltage when the blocking capacitor is not used.

8. The circuit of claim 7, wherein the second multiplexer selects the ground voltage when a data interface is coupled to the interface circuit and the microphone and speaker are not coupled to the interface circuit.

9. The circuit of claim 7, wherein the first multiplexer selects an OFF setting when the microphone and speaker are not coupled to the interface circuit, the OFF setting providing no bias.

10. A device comprising:
a connector circuit to receive a microphone and one or more speakers, or a data interface; and
a signal conditioning circuit comprising a first multiplexer to select a bias for the microphone when the microphone is coupled to the connector circuit, a channel to provide a signal to the speaker, the signal including an alternating current (AC) component and a direct current (DC) component, the DC component of the signal being approximately equal to a common mode voltage, and a return path for the microphone and the spear, the return path including a second multiplexer to select the common mode voltage when the microphone and speaker are coupled to the connector circuit and to select a ground voltage when the microphone and speaker are not coupled to the connector circuit.

11. The device of claim 10, wherein the second multiplexer selects the ground voltage when data interface is coupled to the connector circuit and the microphone and speaker are not coupled to the connector circuit.

12. The device of claim 10, wherein the first multiplexer selects an OFF setting when the microphone and speaker are not coupled to the connector circuit, the OFF setting providing no bias.

13. The device of claim 10, wherein the first multiplexer is programmable to select the bias from one of a plurality of biases based on whether or not the connector circuit includes a blocking capacitor for the channel.

14. The device of claim 13, wherein the connector circuit includes a blocking capacitor for the channel and the selected bias defines a voltage sufficient to properly bias the microphone.

15. The device of claim 13, wherein the connector circuit does not include a blocking capacitor forte channels and the selected bias defines a voltage sufficient to properly bias the microphone plus the common mode voltage.

16. The device of claim 10, further comprising a plurality of channels to provide signals to a plurality of speakers, the plurality of signals each including a respective AC component and a respective DC component, wherein each of the plurality of speakers couple to the return path.

17. A system comprising:
a headset including a speaker and a microphone;
a data interface; and
a device including:
a connector circuit to receive either the headset or the data interface, and
a signal conditioning circuit comprising a first multiplexer to select a bias for a microphone when the headset is connected to the connector circuit, a channel to provide a signal to the speaker when the headset is connected to the connector circuit, the signal including an alternating current (AC) component and a direct current (DC) component, the DC component of the signal being approximately equal to a common mode voltage, and a return path, the return pat including a second multiplexer to select the common mode voltage when the headset is connected to the connector circuit and to select a ground voltage when the data interface is connected to the connector circuit, wherein the first multiplexer is programmable to select the bias from one of a plurality of biases based on whether or not the connector circuit includes a blocking capacitor for the channel.

18. The system of claim 17, wherein the firs: multiplexer selects an OFF setting when the data interface is connected to the connector circuit, the OFF setting providing no bias.

19. The system of claim 17, wherein the connector circuit includes a blocking capacitor for the channel and the selected bias defines a voltage sufficient to properly bias the microphone.

20. The system of claim 17, wherein the connector circuit does not include a blocking capacitor for the channel and the selected bias defines a voltage sufficient to properly bias the microphone plus the common mode voltage.

21. The system of claim 17, further comprising a plurality of channels to provide signals to a plurality of speakers, the plurality of signals each including a respective AC component and a respective DC component, wherein each of the plurality of speakers couple to the return path.

22. A method comprising:
identifying between a data mode and an audio mode in a device;
selecting a ground voltage for a return path when the data mode is identified;
selecting a common mode voltage for the return path when the audio mode is identified; and
selecting a bias for a microphone when the audio mode is identified, the bias having a voltage value sufficient to bias the microphone plus the common mode voltage.

23. The method of claim 22, wherein the common mode voltage defines a voltage value such that substantially no direct current (DC) voltage load is subjected to a speaker in the device, wherein a channel for the speaker does not include a blocking capacitor.

24. The method of claim 22, further comprising selecting no bias for a microphone when the data mode is identified.

25. A circuit comprising:
a microphone electrically coupled to an input amplifier through an input channel;
a first speaker electrically coupled to a first output amplifier through a first output channel;

a second speaker electrically coupled to a second output amplifier through a second output channel;

a first multiplexer to select a bias for the microphone; and a second multiplexer to select a reference voltage for a return path of the microphone and first and second speakers.

26. A circuit comprising:

a channel to provide a signal to a speaker, the signal including an alternating current (AC) component and a direct current (DC) component that is approximately equal to a common mode voltage; and a return path for the speaker, the return path including a multiplexer to select the common mode voltage when a blocking capacitor is used in the channel and to select a ground voltage when the blocking capacitor is not used in the channel, wherein the multiplexer selects the ground voltage when a data interface is coupled to the circuit and the speaker is not coupled to the circuit.

27. The circuit of claim 26, further comprising a plurality of channels to provide signals to a plurality of speakers, the plurality of signals each including a respective AC component and a respective DC component approximately equal to the common mode voltage, wherein each of the plurality of speakers couple to the return path.

* * * * *